United States Patent
Wood

[11] Patent Number: 5,163,772
[45] Date of Patent: Nov. 17, 1992

[54] BALL JOINT
[75] Inventor: Ruey E. Wood, Harrison, Mich.
[73] Assignee: TRW Inc., Lyndhurst, Ohio
[21] Appl. No.: 652,437
[22] Filed: Feb. 8, 1991
[51] Int. Cl.⁵ .............................................. F16C 11/00
[52] U.S. Cl. ................................... 403/133; 403/130; 403/140
[58] Field of Search .............. 403/133, 130, 137, 132, 403/140, 144, 131, 135

[56] References Cited
U.S. PATENT DOCUMENTS

| | | |
|---|---|---|
| 2,979,353 | 4/1961 | Sellers, Jr. . |
| 3,978,276 | 8/1976 | Poffenberger et al. .......... 403/130 X |
| 4,060,331 | 11/1977 | Domer et al. ....................... 403/130 |
| 4,235,558 | 11/1980 | Snyder et al. . |
| 4,555,198 | 11/1985 | Wenning et al. .............. 403/133 X |
| 4,643,608 | 2/1987 | Warner .......................... 403/130 X |
| 4,695,182 | 9/1987 | Wood, Jr. . |
| 4,712,940 | 12/1987 | Wood, Jr. . |
| 4,725,159 | 2/1988 | Wood, Jr. . |
| 4,883,263 | 11/1989 | Bahl ............................... 403/140 X |
| 4,890,949 | 1/1990 | Wood, Jr. ..................... 403/140 X |
| 4,927,285 | 5/1990 | Kotz et al. ..................... 403/133 |

Primary Examiner—Peter M. Cuomo
Attorney, Agent, or Firm—Tarolli, Sundheim & Covell

[57] ABSTRACT

A ball joint has an elastomeric bearing which encapsulates the ball end of a stud. The bearing has a preformed molded shape that supports the bearing and the stud in predetermined positions relative to the socket during assembly of the ball joint. The preformed molded shape of the bearing defines a rib extending circumferentially around the bearing and the ball. The rib is inserted into a corresponding cavity defined by a mating inner surface of the socket.

3 Claims, 2 Drawing Sheets

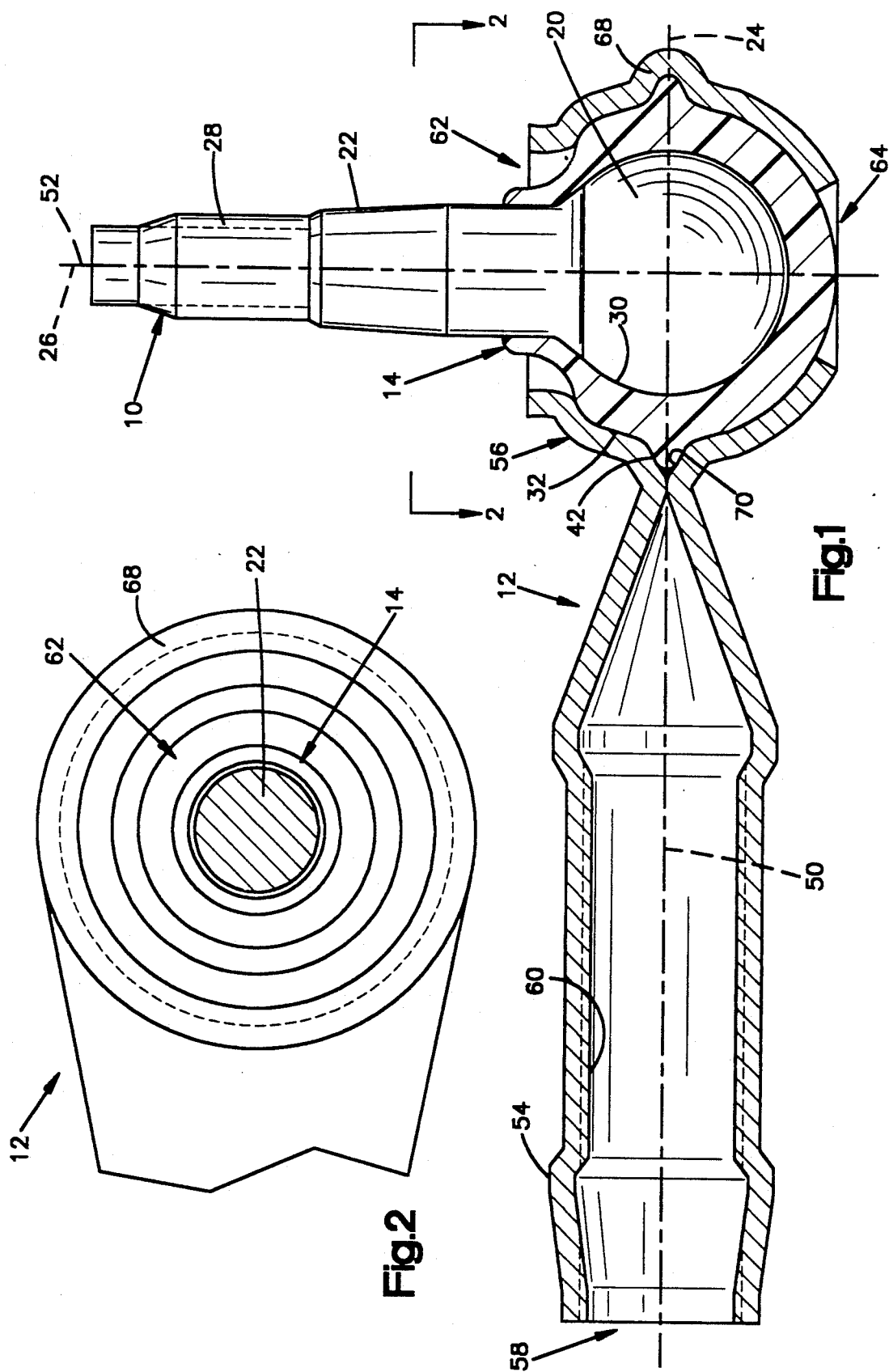

BALL JOINT

FIELD OF THE INVENTION

The present invention relates to a ball joint having an elastomeric bearing.

BACKGROUND OF THE INVENTION

U.S. Pat. No. 2,979,353 discloses a ball joint having an elastomeric bearing supporting a ball in a socket. During assembly of the ball joint, the elastomeric bearing is bonded to the ball. The ball and elastomeric bearing are then forced into an open end of the socket. The bearing is elastically deformed and takes the shape of the inside of the socket when forced into the socket. A closing die then deforms the open end of the socket to close the socket around the bearing, and to give the closed socket and the bearing substantially spherical shapes.

SUMMARY OF THE INVENTION

In accordance with the present invention, a ball joint comprises a stud, an elastomeric bearing, and a socket. The stud comprises a ball and a shank extending from the ball. The elastomeric bearing encapsulates the ball and has an inner surface bonded to the ball. The elastomeric bearing has a preformed molded shape, and includes a projection which extends circumferentially of the bearing and radially away from the ball. The socket has an inner surface defining a chamber in which the bearing is inserted. The inner surface of the socket has a recessed portion defining a cavity which receives the projection on the bearing to locate and support the bearing relative to the socket. After the bearing is inserted into the chamber, the socket is deformed so as to elastically deform and preload the bearing between the ball and the inner surface of the socket.

A ball joint in accordance with the present invention locates the bearing and stud relative to the socket during assembly. When the projection on the bearing is inserted into the cavity in the socket, the projection locates and supports the bearing and stud in predetermined positions relative to the socket. The projection then restrains the bearing and stud from moving from their predetermined positions relative to the socket when the bearing is elastically deformed and preloaded by deformation of the socket. A plurality of ball joints can similarly be assembled with the bearings and studs all in the same predetermined positions relative to their respective sockets. The assembly process is thus repeatable and consistent.

Additionally, the projection on the bearing and the cavity in the socket provide a mechanical interlock between the socket and the bearing. When a force is applied to cause the stud and socket to move relatively from their assembled positions, at least a portion of the elastomeric bearing is further elastically deformed. When the force is removed, the elasticity in the bearing acts to return the stud and socket to their assembled positions. The mechanical interlock assists in returning the stud and socket to their assembled positions. This adds to the life of the ball joint.

In the preferred embodiment of the invention, the cavity is an annular groove defined by a reinforcing section of the socket. The projection is formed as a rib extending circumferentially completely around the bearing, and is larger than the cavity prior to insertion into the socket. When the rib is moved into the socket, it is elastically deformed inwardly. When aligned with the cavity, the rib elastically moves outwardly into the cavity. The rib and adjacent portions of the elastomeric bearing are thus elastically deformed and preloaded before the remainder of the elastomeric bearing is likewise elastically deformed and preloaded by deformation of the socket. The rib thus fits tightly in the cavity and is firmly pressed against the surface of the socket to fill any voids between the bearing and the socket in the region of the cavity upon assembly of the ball joint. If voids remained between the bearing and the socket after assembly of the ball joint, the elastomeric material of the bearing could gradually flow, i.e. creep, into the voids during use of the ball joint. The elastic preloading of the bearing would change if the elastomeric material of the bearing flowed into such voids.

BRIEF DESCRIPTION OF THE DRAWINGS

These and other features of the present invention will become apparent to those of ordinary skill in the art upon reading the following description of a preferred embodiment of the invention in view of the accompanying drawings, wherein:

FIG. 1 is a sectional view of a ball joint in accordance with the present invention;

FIG. 2 is a partial view taken on line 2—2 of FIG. 1;

DESCRIPTION OF A PREFERRED EMBODIMENT

As shown in FIG. 1, a ball joint in accordance with the present invention comprises a steel stud 10, a sheet metal socket 12, and an elastomeric bearing 14 supporting the stud 10 in the socket 12.

The stud 10 is preferably formed of SAE 8115, 8615, 8640, or similar grade steel which is cold formed or machined, carburized or carbonitrided to a 20-30 Rc core hardness and a 0.006-0.015 inch case depth, and supplied by Republic Steel Corp.

Figure 3:
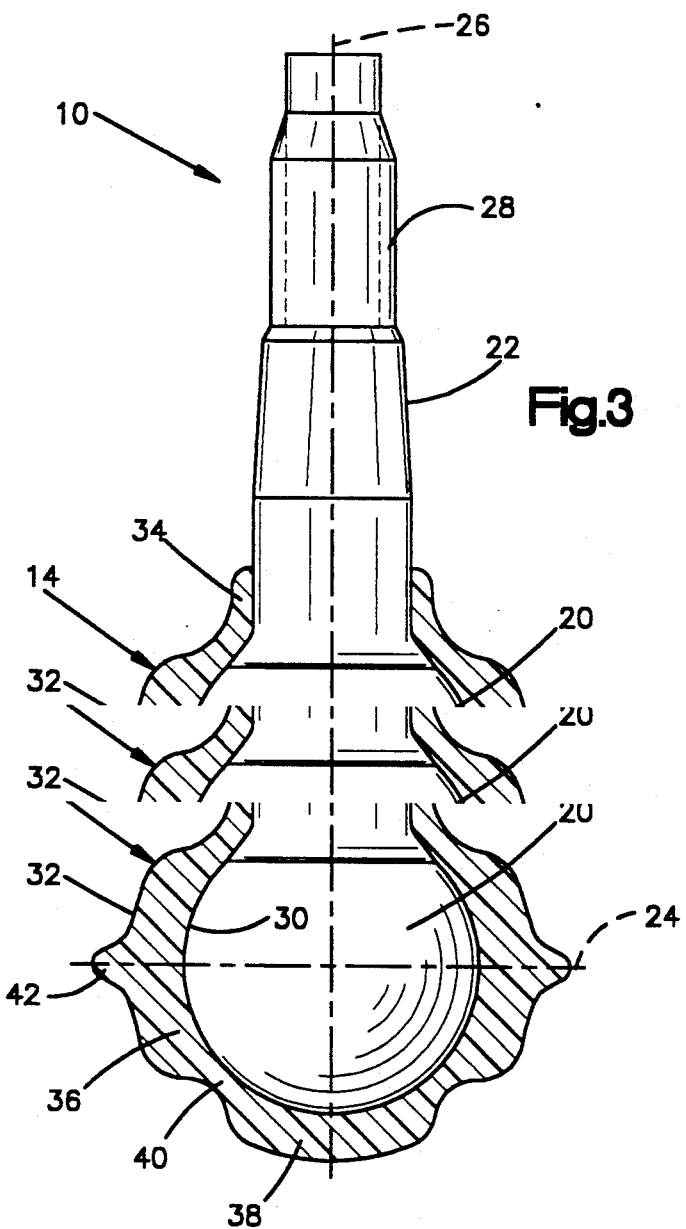
FIG. 3 is a sectional view of part of the ball joint of FIG. 1.

As shown in FIG. 3, the stud 10 comprises ball 20 and a shank 22. The ball 20 has a horizontal axis 24 bisecting the ball 20, and has a vertical axis 26 also bisecting the ball 20. The shank 22 extends from the ball 20 longitudinally along the vertical axis 26, and includes a threaded portion 28 for connecting the stud 10 to a vehicle steering linkage.

The elastomeric bearing 14 is preferably formed of natural rubber or a synthetic equivalent of natural rubber. Most preferably, the bearing 14 is formed of natural rubber (poly-isoprene) which is Banbury mixed and insert molded by injection and/or compression molding, and supplied by Yale-South Haven, Inc. of South Haven, MI.

The bearing 14 is formed around the lower end of the stud 10 in a preformed molded shape as shown in FIG. 3. The bearing 14 has an inner surface 30 bonded to the ball 20 and to an adjacent portion of the shank 22, and thus encapsulates the ball 20. The bearing 14 also has an outer surface 32. The outer surface 32 has a contour defining regions of the bearing 14 which are generally distinct from each other. Such regions of the bearing include a relatively narrow upper region 34 extending around the vertical axis 26, a relatively wide middle region 36 centered on the horizontal axis 24 and extending around the vertical axis 26, and a relatively wide lower region 38 centered on the vertical axis 26. The lower region 38 is separated from the middle region 36 by a relatively narrow region 40 which also extends circumferentially around the vertical axis 26. The outer surface 32 of the bearing 14 further defines a rib 42. The rib 42 has a surface profile shaped in an arc centered on the horizontal axis 24, and extends circumferentially completely around the vertical axis 26.

The socket 12 is stamped from sheet metal using a progressive die, and is preferably formed of SAE grade 950 steel supplied by Worthington Steel Co. with the trademark "Maxi-form 50." The socket 12 could alternately be formed of any SAE/ASTM grade of stamping material suitable to meet the strength, ductility, and formability requirements of the process and the final product application.

Figure 4:
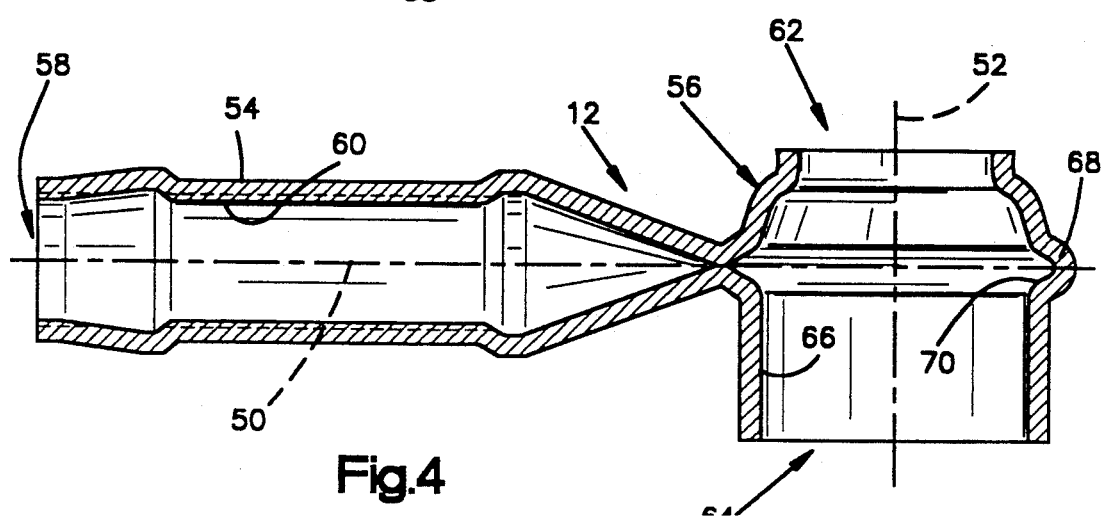
FIG. 4 is a sectional view of a part of the ball joint of FIG. 1 prior to final assembly.

The socket 12 takes the shape shown in FIG. 4 at one stage in the die forming process. As shown in FIG. 4, the socket 12 has a horizontal axis 50, a vertical axis 52, a first end portion 54 remote from the vertical axis 52, and a second end portion 56 centered on the vertical axis 52. The first end portion 54 of the socket 12 has an opening 58 for insertion of the threaded end portion of a tie rod (not shown) of a vehicle steering linkage, and has an inner surface 60 with threads for engaging the threads on the tie rod.

The second end portion 56 of the socket 12, as shown in FIG. 4, has an upper opening 62, a lower opening 64, and an inner surface 66 defining a chamber centered on the vertical axis 52. The second end portion 56 of the socket 12 also has an annular reinforcing section 68. The annular reinforcing section 68 extends circumferentially around the vertical axis 52, and has an arcuate profile centered on the horizontal axis 50. The annular reinforcing section 68 comprises a recessed inner surface portion 70 which extends circumferentially around the vertical axis 52, and which likewise is shaped in an arc centered on the horizontal axis 50. The recessed inner surface portion 70 thus defines an annular cavity in the socket chamber.

During assembly of the ball joint the stud 10 and the bonded bearing 14, as shown in FIG. 3, are inserted into the chamber in the socket 12 through the lower opening 64 as shown in FIG. 4. The bearing 14 is elastically deformed between the ball 20 and the inner surface 66 of the socket 12 upon insertion through the lower opening 64. As the bearing 14 and the stud 10 are moved upwardly into the socket 12 as shown in the drawings, the horizontal ball axis 24 is moved toward the horizontal socket axis 50. When the horizontal ball axis 24 is moved over the recessed inner surface portion 70 of the socket 12, the elastomeric material of the bearing 14 comprising the rib 42 elastically moves outwardly into the cavity defined by the recessed inner surface portion 70. The outer bearing surface 30 at the rib 42 thus moves into mating contact with the complementary recessed inner surface portion 70 of the socket 12 so that the rib 42 and the cavity provide a mechanical interlock between the bearing 14 and the socket 12. The rib 42 thus locates and supports the bearing 14 and the stud 10 in the socket 12 in position horizontally and vertically coaxial with the socket 12 as shown in FIG. 1.

The rib 42 is slightly larger than the cavity when in its preformed molded shape prior to being inserted into the socket 12. The elastomeric material of the bearing 14 is thus deformed and elastically preloaded in and around the rib 42 by the recessed inner surface portion 70 of the socket 12 when the rib 42 is inserted into the cavity. The elastic preload in the elastomeric material holds the rib 42 firmly within the cavity so that the bearing 14 and the stud 10 will be restrained from movement out of their positions coaxial with the socket 12 during further deformation of the socket 12 in the die forming process. The invention thus enables ball joints to be consistently assembled in a repeatable manner in a die forming process with the bearings and studs all being in the same assembled positions relative to their respective sockets.

After the rib 42 is inserted into the cavity, the socket 12 is deformed in the die forming process from the shape shown in FIG. 4 to the shape shown in FIG. 1. The socket 12 is thus deformed around the bearing 14. This deformation reduces the size of the lower opening 64 so that the bearing 14 and the stud 10 are blocked from movement out of the lower opening 64. The deformation of the socket 12 deforms the bearing 14 so that an elastic preload is applied and distributed evenly throughout the elastomeric material of the bearing 14 between the ball 20 and the inner surface 66 of the socket 12. The elastic preload in the bearing 14 firmly presses the outer bearing surface 32 against the inner socket surface 66 so that there are no voids between the bearing 14 and the socket 12. The elastic preload in the bearing 14 also resists movement of the stud 10 out of its assembled position, and exerts an elastic bias urging the stud 10 back to its assembled position when the stud 10 is moved relative to the socket 12 during use of the ball joint.

Further in accordance with the invention, the rib 42 on the bearing 14 and the annular reinforcing section 68 of the socket 12 cooperate to provide a long life for the ball joint. The annular reinforcing section 68 strengthens the socket 12. The rib 42 has a shape and an elastic preload to fill the cavity in the annular reinforcing section 68 so that there are no voids in that region of the ball joint. The elastomeric material of the bearing 14 at the rib 42 therefore will not flow into voids during use of the ball joint. Thus, the elastic preload and the mechanical interlock at the rib 42 will remain substantially unchanged. The ability of the bearing 14 to support the stud 10 in its assembled position on the horizontal and vertical axis 50 and 52, and to urge the stud 10 back toward its assembled position when moved therefrom, will be assisted by virtue of the rib 42 filling the cavity.

The invention has been described with reference to a preferred embodiment. Improvements, changes and modifications will become apparent to those of ordinary skill in the art. Such improvements, changes and modifications are intended to be included within the scope of the appended claims.

Having described the invention, the following is claimed:

1. Apparatus comprising:
 a stud comprising a ball and a shank extending from said ball;
 an elastomeric bearing encapsulating said ball, said bearing having an inner surface bonded to said ball, and having a preformed shape with an outer surface defining a rib extending radially outward, said rib extending circumferentially around said ball;
 a socket having a partially assembled shape defining a chamber centered on an axis, a first opening into said chamber through which said shank is movable along said axis, and a second opening into said chamber through which said ball and said bearing are movable along said axis;

said partially assembled shape of said socket further defining a positioning means for receiving and positioning said rib in said chamber upon movement of said ball and said bearing into said chamber along said axis, said positioning means comprising a recessed inner surface portion of said socket extending circumferentially about said axis at a location axially spaced from said openings, said recessed inner surface portion defining a circumferentially extending cavity which receives said rib when said rib is moved along said axis from said second opening to said cavity;

said socket being deformed from said partially assembled shape to an assembled shape in which said socket blocks movement of said ball and said bearing through said second opening, a substantial portion of said socket being deformed against said bearing and elastically deforming said bearing from said preformed shape to an assembled shape; and said bearing in said assembled shape being elastically preloaded in said chamber between said ball and said socket, with said rib being elastically preloaded in said cavity.

2. Apparatus as defined in claim 1 wherein said socket in said assembled shape has a spherical wall section between said openings and further has an annular reinforcing wall section extending circumferentially around said spherical wall section, said annular reinforcing wall section bulging radially outward from said spherical wall section and comprising said recessed inner surface portion of said socket.

3. Apparatus as defined in claim 1 wherein said rib extends circumferentially entirely around said ball, said cavity extending circumferentially entirely about said axis.

* * * * *